United States Patent [19]

Cobb

[11] Patent Number: 4,646,799
[45] Date of Patent: Mar. 3, 1987

[54] WOOD SPLITTING DEVICE

[76] Inventor: William O. Cobb, Rte. 4, Box 327, Haughton, La. 71037

[21] Appl. No.: 822,391

[22] Filed: Jan. 27, 1986

[51] Int. Cl.⁴ .................................................. B27L 7/00
[52] U.S. Cl. .................................. 144/193 G; 42/106; 89/1.4; 144/193 C
[58] Field of Search ........... 144/193 R, 193 C, 193 G; 89/1.1, 1.4, 16; 42/1 R

[56] References Cited

U.S. PATENT DOCUMENTS 2,966,682  1/1961  Henning ................................. 42/1 R
2,966,683  1/1961  Schulz ................................... 42/1 R Primary Examiner—W. D. Bray
Attorney, Agent, or Firm—John M. Harrison

[57] ABSTRACT

A wood splitting device which is characterized by a cylindrical housing, a wedge-shaped blade slidably disposed in the housing, a cap closing the housing at the top and enclosing a receiver having one or more cartridge apertures communicating with the interior of the housing and the blade shaft for receiving one or more cartridge blanks; and a firing pin mechanism provided in the cap and communicating with the cartridge blank or blanks, wherein the blade is forced downwardly in the housing to split a log responsive to firing of the cartridge blank or blanks by the firing pin mechanism.

30 Claims, 11 Drawing Figures

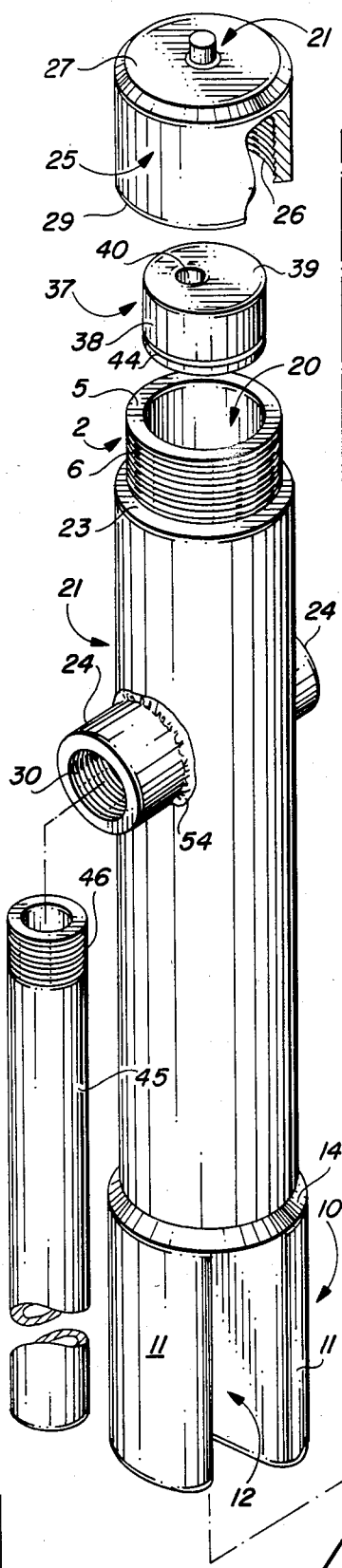
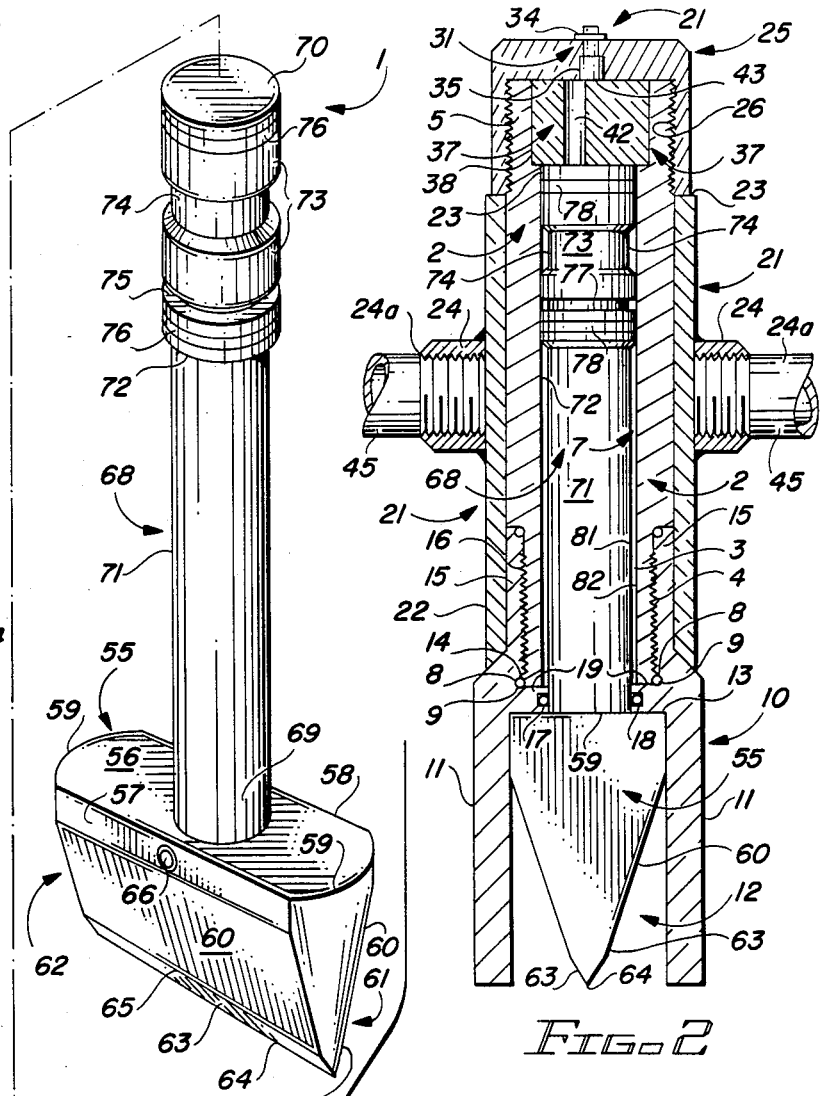
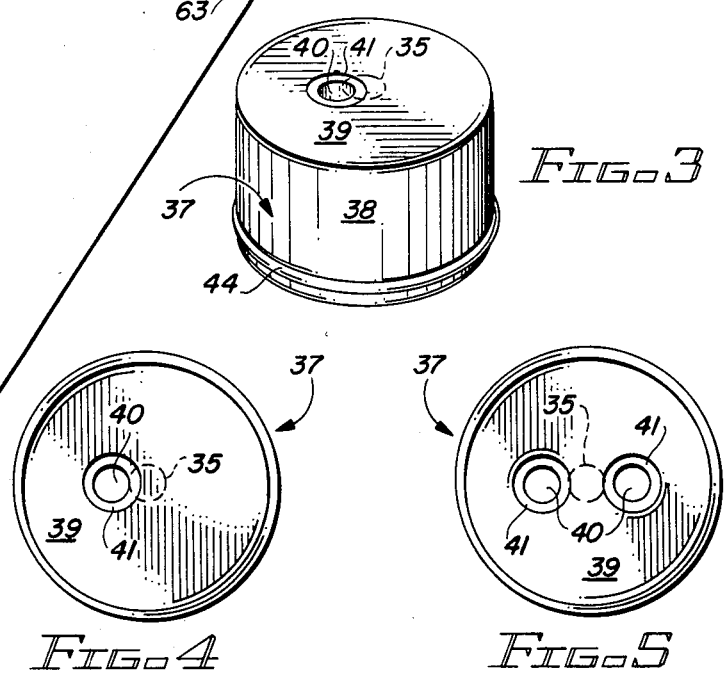
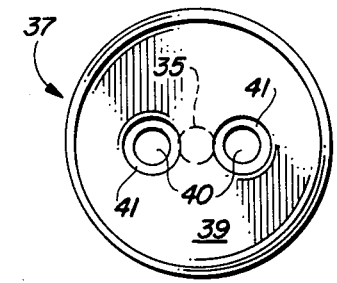

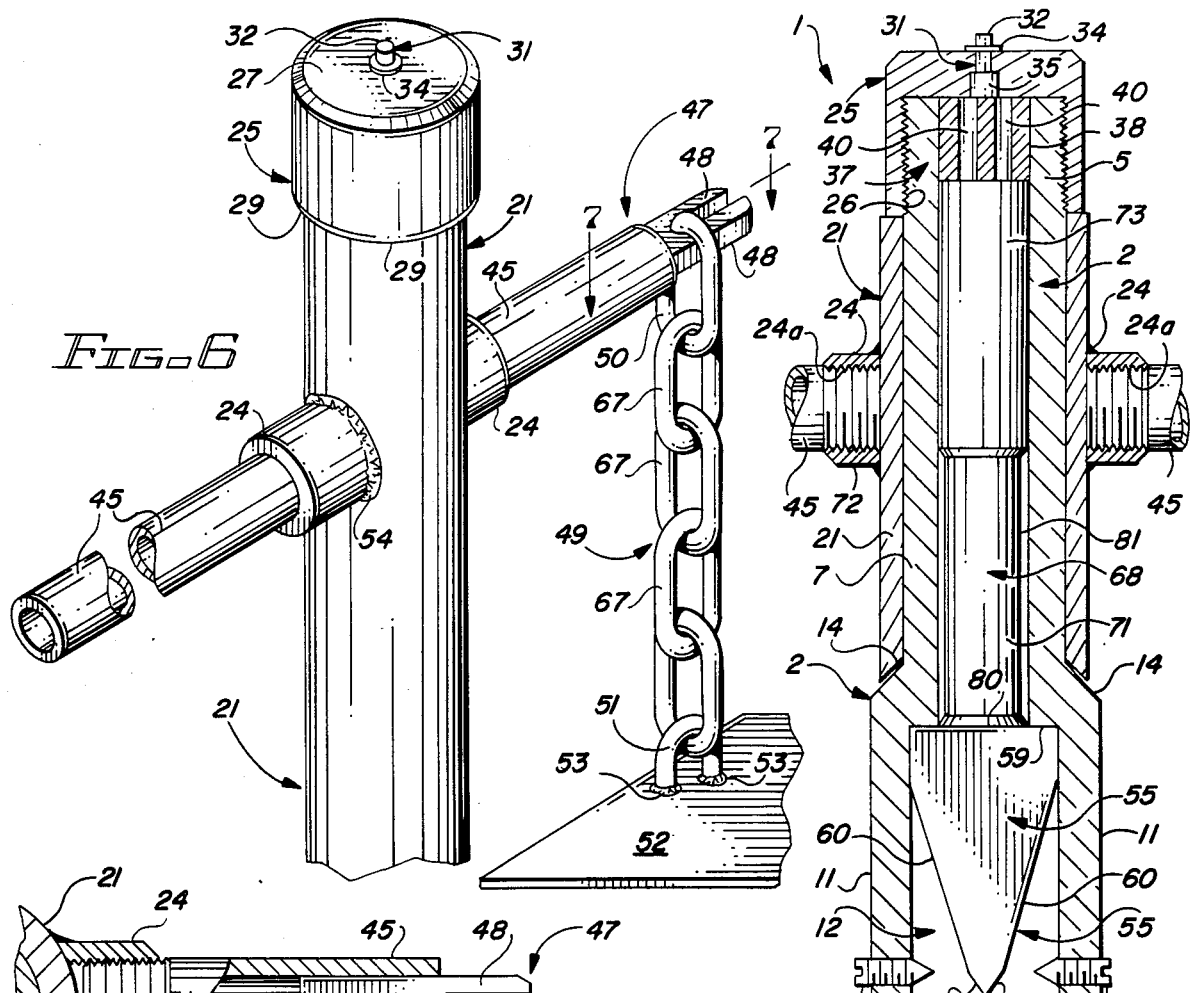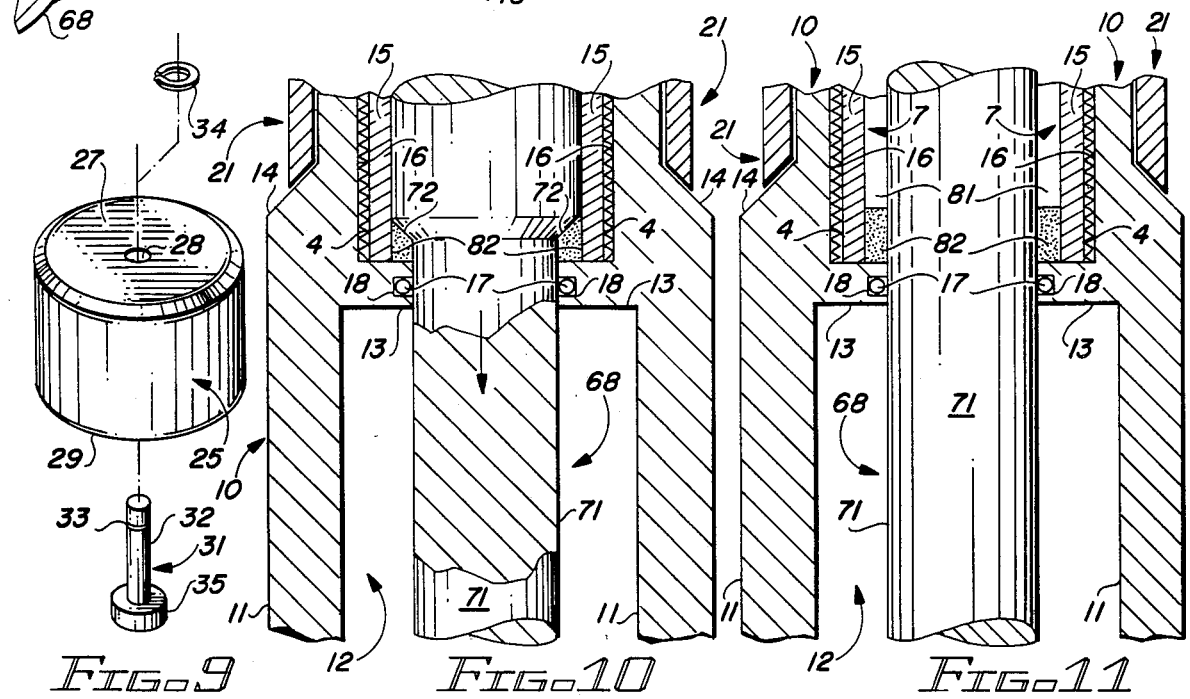

WOOD SPLITTING DEVICE

BACKGROUND OF THE INVENTION

1. Field of the Invention

This invention relates to devices for splitting wood and more particularly, to a wood splitting device which is characterized by a cylindrically-shaped housing, a blade slidably disposed in the housing and a cap closing the housing. The cap contains a selected receiver which is fitted with at least one bore or aperture for receiving one or more cartridge blanks and a firing pin is seated in the cap for firing the cartridge blank or blanks, wherein such firing forces the blade downwardly and into the log to split the log. In a preferred embodiment, the blade shaft is provided with piston rings and O-rings for sealing purposes and handles are provided on the housing, with a cooperating chain and anchoring mechanism fitted to one of the handles to secure the wood splitting device in position on the end of a log to be split. In a most preferred embodiment the shaft is reduced in diameter near the blade to define a fluid chamber which contains oil in order to arrest the downward extension of the blade and blade shaft in the housing. Various receivers are designed for location in the top of the housing to receive one or more cartridge blanks, depending upon the size of the log to be split and the firing pin mechanism is configured to fire one or several cartridge blanks located in the receiver.

2. Description of the Prior Art

The art of splitting logs has evolved from the use of rudimentary axes, of both the double and single blade design, and splitting wedges, to a highly refined art utilizing hydraulically-powered blades and blades which are operated by exploding mechanisms. The earliest techniques for splitting wood involved using a double or single-bladed axe to split individual logs by striking one end of the upturned logs with the blade. A popular modern log-splitting mechanism consists of a trailer-mounted hydraulic ram with a blade attached to one end and a frame for receiving logs of various sizes, wherein the logs are split by activating by hydraulic mechanism which forces the blade into the log. These machines are great time savers and require only a fraction of the energy required to split logs by conventional techniques using an axe or splitting wedge. However, the devices are frequently difficult to maneuver into the deep woods, although they are easily moved by trailer along access and logging roads in wooded areas.

Typical of the early log splitting devices is the Log Splitting Gun disclosed in U.S. Pat. No. 1,965,136, dated July 3, 1934, to Q. E. Crume. This device is characterized by a longitudinally bored barrel which is tapered at the log-penetration end, with a screw threaded laterally in the barrel to serve as a fuse hole. A firing tube which includes a stem having a screw threaded portion is tapped into the screw threaded hole with the outer end of the stem formed with a tool-receiving head. The tube is characterized by a substantially L-shaped passage, the laterally directed inner end of which is enlarged to form a fuse introduction socket and the intermediate portion is restricted in diameter to accommodate the fuse. The inner socket constitutes an expansion pocket and the outer socket, means to facilitate introduction of the fuse into the device. U.S. Pat. No. 2,132,114, dated Oct. 4, 1938, to R. B. Hutchinson, discloses an "Exploding Splitting Tool". The tool of this invention is characterized by an explosive receiving barrel which is closed at one end and is provided with a fuse-receiving port. A blade adapted to be driven into a log or other segment of wood to be split is provided with a tubular neck, a portion of which neck telescopes within the open end of the barrel. The wall of the barrel at the open end is substantially perpendicular to the axis of the barrel and the projecting portion of the neck is provided with an integral annular projection forming an annular, substantially V-shaped notch with the end wall of the barrel. A weld in the notch connects the projecting portion to the adjoining end wall of the barrel. A "Log Splitting Blasting Wedge and Anchor System" is disclosed in U.S. Pat. No. 4,351,376, dated Sept. 28, 1982, to Albert F. Vosika. This device includes an elongated base frame having forwardly extending tines, into which one end of a log is rolled. A charged blasting wedge is removably supported on a carriage structure which is vertically and adjustably supported on an upright backing structure for aligning the wedge with the center of the log. The backing structure is raised relative to the base frame and in a preferred embodiment, the blasting wedge includes an elongated body having a forwardly tapered forward end portion, a generally cylindrical middle portion and a solid rearward end portion. Multiple longitudinally spaced wick holes are provided through the body in communication with the central bore, which is adapted to receive a charge of blasting powder. U.S. Pat. No. 4,479,524, dated Oct. 30, 1984, also to Albert F. Vosika, details a log splitting method and apparatus which includes placing a charge of blasting powder in a log splitting blasting wedge; axially driving the wedge into one end of a log to be split; adjusting the height of a wedge-receiving sleeve on the tower of an anchor structure and moving the anchor structure against the wedge; and igniting the charge in the wedge, thereby blasting the log into several sections. The anchor structure may be secured in the ground by stakes and in the process of making firewood, log can be first split and then blocked. The wedge may alternatively be set in the side of a tree stump with the anchor structure supported in a cavity excavated on one side thereof to split the stump, in order to facilitate removal of the stump.

It is an object of this invention to provide a new and improved wood splitting device which is characterized by a housing, a blade shaft slidably disposed in the housing, a blade secured to one end of the blade shaft, a receiver in the upper bore of the housing for locating at least one cartridge blank adjacent the opposite end of the blade shaft and a firing mechanism located in a cap enclosing the receiver for firing the cartridge blank and forcing the blade into a block or log of wood to be split.

Another object of the invention is to provide a cartridge blank-powered wood splitting device which includes a housing having an internal bore and a cap threaded on one end of the housing, with a selected cartridge receiver located inside the housing and cap; one or more cartridge blanks inserted in apertures provided in the receiver; a blade shaft slidably disposed in the bore and a wedge-shaped blade secured to one end of the blade shaft; and a firing pin mounted in the cap and extending into contact with the cartridge blank or blanks for firing the cartridge blank or blanks and forcing the blade into a log to be split.

Still another object of this invention is to provide a wood splitting device which operates from one or more fired cartridge blanks located in a selected single or multiple-cartridge blank receiver positioned inside the top of a cylindrical housing; a central bore provided in the housing, which bore communicates with the receiver and receives a blade shaft sealed with at least one O-ring and at least one piston ring and carrying a wedge-shaped blade at the extending end; and a fluid chamber containing a hydraulic fluid such as oil, extending between a portion of the blade shaft and the central bore of the housing for cushioning contact between the blade shaft and housing at blade extension. Firing of the cartridge blank or blanks in the receiver forces the blade into a length of wood, thus splitting the wood.

SUMMARY OF THE INVENTION

These and other objects of the invention are provided in a wood splitting device which includes a cylindrical housing having a bore therethrough, a bifurcation at one end and a cap threaded to the opposite end; a blade shaft slidably disposed in the bore of the housing; a blade secured to the extending end of the blade shaft and normally located in the bifurcation; a receiver positioned inside the top of the housing for locating one or more cartridge blanks above the shaft for forcing the blade from the bifurcation into a length of wood to be split responsive to firing of the cartridge blank or blanks; and a pair of arms extending from the housing with a chain connecting one of the arms to an immobile plate or alternative anchor for stabilizing the wood splitting device on a block or log of wood to be split.

BRIEF DESCRIPTION OF THE DRAWING

The invention will be better understood by reference to the accompanying drawings, wherein:

FIG. 1 is an exploded view of a preferred embodiment of the wood-splitting device of this invention, wherein the blade shaft is sealed in the barrel by piston rings and O-rings;

FIG. 2 is a longitudinal sectional view of the wood-splitting device illustrated in FIG. 1;

FIG. 3 is a perspective view of a receiver for receiving a single cartridge blank which is used to operate the wood-splitting device illustrated in FIGS. 1 and 2;

FIG. 4 is a top view of the receiver illustrated in FIG. 3;

FIG. 5 is a top view of an alternative receiver which is chambered for two cartridge blanks;

FIG. 6 is a perspective view of the top segment of the wood-splitting device illustrated in FIGS. 1 and 2, fitted with support means for stabilizing the wood-splitting device in functional configuration;

FIG. 7 is a sectional view of a preferred mounting for the handles utilized in stabilizing the wood-splitting device;

FIG. 8 is a longitudinal sectional view of an alternative embodiment of the wood splitting device of this invention;

FIG. 9 is a perspective view of a cap and cooperating firing pin for firing a cartridge blank or blanks to operate the wood-splitting device;

FIG. 10 is a sectional view of a lower portion of the wood-splitting device illustrated in FIGS. 1 and 2, with the blade shaft in lowered configuration; and FIG. 11 is a sectional view of the lower portion of the wood-splitting device illustrated in FIGS. 1 and 2, with the blade shaft in elevated configuration.

DESCRIPTION OF THE PREFERRED EMBODIMENTS

Referring initially to FIGS. 1 and 2 of the drawings, the wood-splitting device of this invention is generally illustrated by reference numeral 1. The wood-splitting device 1 is characterized by a cylindrically-shaped barrel 2 having a bottom nipple 3, fitted with bottom nipple threads 4 and a top nipple 5, provided with top nipple threads 6. The barrel 2 is further characterized by a receiver bore 20, provided in the top nipple 5 and a barrel bore 7 having a diameter smaller than the receiver bore 20 and communicating with the receiver bore 20, the barrel bore 7 extending longitudinally through the barrel 2. A blade seat 10 is threadably secured to the bottom nipple 3 of the barrel 2 by means of seat nipple threads 16, located on the seat nipple 15 and engaging the bottom nipple threads 4. A seat taper 14 is defined in the blade seat 10 at the base of the seat nipple 15 and a pair of seat legs 11 extend downwardly from the seat taper 14 to define a bifurcation 12, which accommodates the blade 55, as hereinafter further described. In a preferred embodiment of the invention the seat legs 11 are formed integrally with a shaft guide 19 extending inwardly of the seat legs 11 and with the seat nipple 15, in order to provide maximum strength in the blade seat 10. A barrel O-ring 8 is seated in a barrel O-ring groove 9 provided in the shaft guide 19 and the outer circumferential edge of the seat nipple 15 engages the barrel O-ring 8 when the blade seat 10 is threaded on the barrel 2. A seat shoulder 13 is defined by the junction between the shaft guide 19 and the seat legs 11, in order to seat the blade 55 when the blade 55 is located in a fully retracted position with the blade shaft 68 positioned inside the barrel 2, as illustrated in FIG. 2. A seat O-ring 17 housed in a seat O-ring groove 18, encircles that segment of the blade shaft 68 which traverses the piston guide 19. A cylindrical sleeve 21 fits over the barrel 2 and is provided with a sleeve bevel 22 at the bottom end, which sleeve bevel 22 matches the seat taper 14 in the blade seat 10. A sleeve edge 23 terminates the opposite end of the sleeve 21 and ends at the base of the top nipple threads 6, provided in the top nipple 5, as illustrated in FIG. 1. A pair of sleeve nipples 24 are each secured by means of a nipple weld 54 to the sleeve 21 and extend outwardly in substantially perpendicular relationship with respect to the sleeve 21. A pair of handles 45, each provided with external threads 46, are threadably attached to the internal nipple threads 30 of the sleeve nipples 24, respectively, in order to provide a means for securing the wood-splitting device 1 in functional position, as hereinafter described. A cylindrically-shaped cap 25, which is provided with internal cap threads 26, is threadably attached to the top nipple 5 of the barrel 2, as illustrated in FIGS. 1 and 2. When fully seated on the top nipple threads 6, the bottom edge 29 of the cap 25 is seated against the sleeve edge 23 of the sleeve 21, as illustrated in FIG. 2. In this manner, the cap 25 serves to secure the sleeve 21 on the barrel 2 with the sleeve bevel 22 pressed against the seat taper 14 of the blade seat 10.

As illustrated in FIGS. 1, 2 and 9 of the drawings, the center of the cap top 27 of the cap 25 is provided with a firing pin aperture 28 which receives the pin shaft 32 of a firing pin 31 in sliding relationship, as further illustrated in FIG. 2. The firing pin 31 is further characterized by a clip groove 33, which is shaped to receive a clip 34 in order to prevent the firing pin 31 from exiting the cap top 27 when the blade shaft 68 extends downwardly during operation of the wood splitting device 1, as hereinafter further described. An enlarged pin base 35 terminates the pin shaft 32 of the firing pin 31 and serves to contact the cartridge rim 43 of a cartridge blank 42, in order to fire the cartridge blank 42, as illustrated in FIG. 2. As further illustrated in FIG. 2, the receiver 37 is sized to fit in the enlarged receiver bore 20 of the barrel bore 7 in the top nipple 5 of the barrel 2 and is closed by the cap 25, in order to position the rim-fire cartridge blank 42 above the blade shaft 68 and beneath one edge of the pin base 35 of the firing pin 31. In this manner, the cartridge blank 42 can be fired by striking that end of the pin shaft 32 which projects through the firing pin aperture 28 in the cap top 27, in order to operate the wood-splitting device 1, as hereinafter further described.

Referring now to FIGS. 3 and 4 of the drawings in a preferred embodiment of the invention the receiver 37 is characterized by a cylinder 38, having a flat cylinder top 39 and a cartridge aperture 40 extending through the cylinder 38, with a rim seat 41 shaped in the cartridge aperture 40 to receive the cartridge rim 43 of a cartridge blank 42, as illustrated in FIG. 2. In a most preferred embodiment a receiver ring 44 is seated in a groove (not illustrated) in the cylinder 38, for sealing purposes and to aid in removing the receiver 37 from the barrel bore 7. As further illustrated in FIG. 5, an alternative receiver 37 is illustrated, wherein a pair of cartridge apertures 40 are provided in the cylinder 38 with matching rim seats 41 in order to accommodate a pair of cartridge blanks (not illustrated) which can be simultaneously fired by the pin base 35 of the firing pin 31, as illustrated in phantom.

Referring now to FIGS. 6 and 7 of the drawings in another most preferred embodiment of the invention the handles 45 are threadably inserted in the respective sleeve nipples 24 as heretofore described, in order to provide a means for handling and supporting the wood-splitting device 1 when the device is in functional configuration. A chain fork 47 is provided in one end of one of the handles 45 and is characterized by a pair of extending tines 48, with a space therebetween for inserting the top link 50 of a chain 49 in order to support the chain 49 from the chain fork 47. The opposite end of the chain 49 is secured by means of a bottom link 51 to a mount plate 52 by means of a chain weld 53, which mount plate 52 is, in turn, secured to the ground or other supporting surface in order to stabilize the wood-splitting device 1 when the cartridge blank or blanks 42 are fired, as hereinafter described. It will be appreciated by those skilled in the art that logs and blocks of wood of varying length can be easily split using the chain 49 and mount plate 52, by engaging the top link 50 or any of the intermediate links 67 of the chain 49 with the tines 48 to stabilize the wood splitting device 1. Alternatively, the intermediate links 67 can be slipped into the bifurcation between the tines 48 to secure the chain 49 to the chain fork 47, as desired.

As further illustrated in FIGS. 1 and 2 of the drawings, the blade 55 is threaded to the blade shaft 60 of the blade shaft 68 at the bottom end 69, while the top end 70 of the blade shaft 68 projects upwardly in the barrel bore 7 and terminates against the receiver 37 when the blade 55 is in the retracted, firing position. As illustrated in FIG. 1 in a most preferred embodiment of the invention, the blade 55 is characterized by a flat blade top 56 with a front margin 57 and rear margin 58 extending in parallel relationship to define front and rear edges of the blade top 56 and curved side margins 59 connecting the front margin 57 and rear margin 58, as illustrated. The front margin 57 and rear margin 58 are flat and extend downwardly from the blade top 56 to a primary bevel 60, which terminates at a bevel margin 65. A pair of secondary bevels 63 begin on opposite sides of the blade 55 at the bevel margin 65 and converge at the blade edge 64 to define a chisel point. In a most preferred embodiment of the invention the blade 55 is further characterized by a long side 61 and a short side 62, wherein the faces of each of the primary bevels 60 are shaped in the configuration of a trapezoid, to better facilitate splitting logs, as hereinafter further described. In yet another most preferred embodiment of the invention a roll pin 66 extends through an aperture (not illustrated) at the front margin 57 of the blade 55 and through a corresponding aperture (not illustrated) in the bottom end 69 of the blade shaft 68, in order to secure the blade 55 to the blade shaft 68.

In a still further preferred embodiment of the invention and referring again to FIGS. 1 and 2 of the drawings, the blade shaft 68 is characterized by an inset portion 71 and a seal portion 73, which meet at a shaft shoulder 72, as particularly illustrated in FIG. 2. An inset 74 is also provided in the seat portion 73 of the blade shaft 68, in order to reduce friction as the seal portion 73 of the blade shaft 68 traverses the barrel bore 7 of the barrel 2. An O-ring seat 75 and a pair of piston ring seats 76 are provided in the lower portion of the seal portion 73 of the blade shaft 68, in order to accommodate an O-ring 77 and a pair of piston rings 78, respectively, as illustrated in FIG. 2. Accordingly, it will be appreciated from a consideration of FIGS. 1 and 2 of the drawings that the blade shaft 68 is sealed inside the barrel bore 7 of the barrel 2 by means of the O-ring 77, piston rings 78 and the seat O-ring 17, the latter of which is located in the piston guide 19 of the blade seat 10, for purposes which will be hereinafter more fully described. Furthermore, the receiver 37 is sealed inside the receiver bore 20, which communicates with the barrel bore 7, by means of the receiver ring 44.

Referring now to FIGS. 1, 2, 10 and 11 of the drawings it will be appreciated that the space between the inset portion 71 of the blade shaft 68 and the barrel bore 7 of the barrel 2 defines a fluid chamber 81, which contains a level of oil 82 in the bottom area thereof. Accordingly, as illustrated in FIG. 10, when the blade shaft 68 moves downwardly in the direction of the arrow responsive to firing one or more of the cartridge blanks 42, the shaft shoulder 72 of the blade shaft 68 contacts the oil supply 82 located in the fluid chamber 81 and this action terminates the downward motion of the blade shaft 68. Accordingly, the oil 82 acts as a shock absorber to dampen and absorb the inertia of the downwardly descending blade 55 and blade shaft 68 without damage to the shaft shoulder 72 or the blade seat 10.

Referring to FIGS. 5 and 8 of the drawing in an alternative embodiment of the invention, the wood-splitting device 1 is characterized by a barrel 2 which, like the wood-splitting device 1 illustrated in FIGS. 1 and 2, is characterized by a top nipple 5, provided with top nipple threads 6 and a barrel bore 7. However, the barrel 2 illustrated in FIG. 8 is further characterized by integrally formed seat legs 11, provided wtih threaded blade stops 79 in the extending ends thereof, in order to prevent the blade 55 from exiting the bifurcation 12 when dual cartridge blanks (not illustrated) are loaded into the two cartridge apertrues 40 located in the receiver 37, which is more particularly illustrated in FIG. 5. Furthermore, the blade shaft 68 in this embodiment of the wood splitting device 1 is characterized by an inset portion 71 and a seal portion 73, separated by a shaft shoulder 72. In a preferred embodiment of the invention the blade 55 is secured to the end of the inset portion 71 of the blade shaft 68 by means of a blade weld 80.

In operation and referring again to FIGS. 1, 2, 6, 10 and 11 of the drawings, the wood-splitting device 1 is readied for operation by initially unthreading the cap 25 from the top nipple threads 6 of the barrel 2 and removing the receiver 37, which is also illustrated in FIGS. 3 and 4. It will be appreciated by those skilled in the art that the receiver 37 can be characterized by a first receiver 37 having a single cartridge aperture 40, as illustrated in FIGS. 3 and 4 or a second receiver 37 provided with a double cartridge aperture 40, as illustrated in FIG. 5 of the drawings. It will be further appreciated that additional receivers 37 can be provided with additional cartridge apertures 40, depending upon the desired splitting force required in the wood-splitting device 1. Accordingly, as illustrated in the drawings, either a single cartridge blank 42 or a pair of cartridge blanks 42 are loaded into the cartridge aperture 40 or cartridge apertures 40, as desired, in the selected receiver 37, with the cartridge rim or rims 43 provided in alignment with the respective rim seat or seats 41. The appropriate receiver 37 is then replaced in the receiver bore 20 of the two nipple 5 and the cap 25 is rethreaded on the top nipple threads 6, as illustrated in FIG. 2. The wood-splitting device 1 is then oriented as illustrated in FIG. 6, with that portion of the blade edge 64 which corresponds to the long side 61 of the blade 55, located in the cambium layer of a vertically oriented log or block of wood to be split and the short side 62 of the blade 55 facing the center of the log or block. The chain 49 is then oriented with a top link 50 or one of the intermediate links 67 engaging the tines 48 as illustrated in FIG. 6, in order to secure the corresponding handle 45 to the mount plate 52. It is undertsood that the mount plate 52 has been previously securely mounted to the ground or supporting surface and that the bottom link 51 of the chain 49 is welded to the mount plate 52 by means of the chain weld 53, as illustrated. The opposite handle 45 is then grasped and held with a downward force and the end of the pin shaft 32 of the firing pin 31 is struck in order to sharply engage the pin base 35 with the cartridge rim or rims 43 of the cartridge blank or blanks 42. This action ignites the powder in the cartridge blank or blanks 42 and forces the blade shaft 68 and the blade 55 downwardly, where the slanted blade edge 64 progressively penetrates the log or block from the long side 61 to the short side 62 and splits the log. The blade 55 and blade shaft 68 are then manually retracted in the barrel bore 7 of the barrel 2, the cap 25 is again removed, the spent cartridge blank or blanks 42 are removed from the receiver 37 using a nail or rod, a new cartridge blank or blanks 42 is inserted in the cartridge aperture or apertures 40 of the selectede receiver 37 and the firing and splitting procedure is repeated.

Referring now to FIG. 8 of the drawings, it will be appreciated that the wood splitting device 1 of this design is operated in the same manner as the wood splitting device 1 illustrated in FIGS. 1 and 2. However, it will be further appreciated that the means for arresting downward movement of the blade 55 is different and includes the threaded blade stops 79, which project inside the bifurcation 12. Accordingly, the length of travel of the blade 55 can be adjusted by adjusting the length of projection of the blade stops 79 into the bifurcation 12 and the blade 55 and blade shaft 68 can be removed from the barrel bore 7 of the barrel 2 by backing the blade stops 79 away from the bifurcation 12.

Referring again to FIGS. 1 and 2 of the drawings the wood splitting device illustrated can be disassembled by removing the cap 25, the receiver 37 and the sleeve 21 and unthreading the barrel 2 from the blade seat 10 at the bottom nipple threads 4 and the seat nipple threads 16. The blade 55 and blade shaft 68 are then extended downwardly with the blade 55 extended from the bifurcation 12 and the roll pin 66 is removed from the blade 55. The blade 55 is then unthreaded from the blade shaft 68 and the O-ring 8, seat O-ring 17, blade shaft O-ring 77 and piston rings 78 can then be replaced or cleaned, as desired. It will also be appreciated that the piston rings 78, positioned on the seal portion of the blade shaft 68, and the receiver ring 44, located on the receiver 37, are compression rings designed to seal the expanding gasses from the fired cartridge blank or blanks 42. THe O-ring 77 helps to facilitate this sealing operation and in combination with the barrel O-ring 8 and seal O-ring 17, also serves to seal the oil 82 in the fluid chamber 81. It is further udnerstood that the piston rings 78, and particularly, the top piston ring 78, also serve to wipe the barrel bore 7 free of accumulated powder residue resulting from firing of the cartridge blank 42. This wiping action allows easy return of the blade shaft 68 to the firing position.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, I claim:

1. A device for splitting wood using at least one cartridge blank, said device comprising:
   (a) an elongated housing and a longitudinal bore provided in said housing;
   (b) a cap removably closing one end of said housing and firing pin means slidably carried by said cap;
   (c) blade means slidably disposed in said bore and extendible from the opposite end of said housing; and
   (d) receiver means positioned in said bore and located adjacent said one end of said housing, said receiver means adapted to receive the cartridge blank, whereby said blade means is forced against the wood responsive to striking said firing pin means and firing the cartridge blank.

2. The device of claim 1 wherein said blade means further comprises an elongated bladeshaft slidably disposed in said bore and a blade carried by one end of said blade shaft.

3. The device of claim 2 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge.

4. The device of claim 2 further comprising a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

5. The device of claim 2 further comprising at least one compression ring carried by said blade shaft for slidably sealing said blade shaft in said bore.

6. The device of claim 2 further comprising at least one O-ring carried by said blade shaft for slidably sealing said blade shaft in said bore.

7. The device of claim 2 further comprising:
   (a) at least one compression ring carried by said blade shaft for slidably sealing said blade shaft in said bore; and
   (b) at least one O-ring carried by said blade shaft for slidably sealing said blade shaft in said bore.

8. The device of claim 7 wherein said blade is further characterized by a genrally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge.

9. The device of claim 8 further comprising a blade pin aperture providing in said blade and a shaft pin aperture provided in said one end of said blade shaft in registration with said blade pin aperture and a pin projecting through said blade pin aperture and said shaft pin aperture for securing said blade to said blade shaft.

10. The device of claim 2 wherein said blade shaft is further characterized by an inset portion extending from said blade; a seal portion extending from the opposite end of said blade shaft from said blade, said inset portion having a diameter which is smaller than the diameter of said seal portion and said inset portion together with said barrel bore defining a fluid chamber; a shaft shoulder joining said inset portion and said seal portion and a substantially viscous fluid provided in said fluid chamber, whereby said shaft shoulder contacts said viscous fluid responsive to downward movement of said blade shaft to arrest the travel of said blade.

11. The device of claim 10 wherein said blade is further characterized by a generally wedge-shaped blade having substantially parallel front margins and curved side margins connecting said front margins in spaced relationship and further comprising a pair of oppositely-disposed primary bevels tapering from said front margins and a pair of oppositely-disposed secondary bevels terminating said primary bevels at one edge of said primary bevels, respectively, said second bevels converging to a blade edge.

12. The device of claim 11 further comprising a blade pin aperture provided in said blade and a shaft pin aperture provided in said one end of said blade shaft in registration with said blade pin aperture and a pin projecting through said blade pin aperture and said shaft pin aperture for securing siad blade to said blade shaft.

13. The device of claim 12 further comprising at least one compression ring carried by said seal portion of said blade shaft for slidably sealing said seal portion of said blade shaft in said bore.

14. The device of claim 13 further comprising at least one O-ring carried by said seal portion of said blade shaft for slidably sealing said seal portiOn of said blade shaft in said bore.

15. THe device of claim 1 further comprising handle means carried by said housing for handling said device.

16. The device of claim 15 further comprising mounting means located in close proximity to at least one of said handle means and correcting means having one end attached to said at least one of said handle means and the opposite end of said connecting means attached to said mounting means.

17. A cartridge blank-operated device for splitting wood comprising:
   (a) an elongated, generally cylindrically-shaped barrel having a longitudinal bore therein, a threaded top nipple provided on one end of said barrel and a threaded bottom nipple provided on the opposite end of said barrel;
   (b) a generally cylindrically-shaped seat having a threaded seat nipple projecting from one end thereof, said seat nipple threadibly connecting to said bottom nipple of said barrel; parallel seat legs projecting from the opposite end of said blade seat to define a bifurcation in said blade seat; and a shaft guide opening provided in said blade seat, said shaft guide opening oriented substantially in registration with said bore in said barrel when said blade seat is attached to said barrel;
   (c) an elongated, round shaft having one end slidably located in said bore of said barrel and a generally wedge-shaped blade carried by the opposite end of said shaft, said shaft characterized by an inset portion extending from said blade; a seal portion extending from said one end of said blade shaft, said inset portion having a diameter which is smaller than the diameter of said seal portion and said inset portion together with said barrel bore defining a fluid member; a shaft shoulder joining said inset portion and said seal portion; and a substantially viscous fluid provided in said fluid chamber;
   (d) a generally cylindrically-shaped sleeve fitted on said barrel in slidable relationship and handle means carried by said sleeve for handling said device and stabilizing said device on a length of wood to be split;
   (e) an internally-threaded cap threadibly attached to said top nipple of said barrel, said cap seated against said sleeve when said cap is fully threaded on said top nipple;
   (f) receiver means positioned in said bore and inside said cap, said receiver means adapted to receive at least one of the cartridge blank; and
   (g) firing pin means carried by said cap in sliding relationship and extending through said cap in contact with the cartridge blank, whereby said blade is forced into the wood responsive to striking said firing pin and firing the cartridge blank.

18. The device of claim 17 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge os aid primary bevels respectively, said secondary bevels converging to a blade edge.

19. The device of claim 17 further comprising a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

20. The device of claim 17 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge and further comprising a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

21. The device of claim 17 further comprising:
    (a) at least one compression ring carried by said blade shaft for slidably sealing said blade shaft in said bore; and
    (b) at least one O-ring carried by said blade shaft for slidably sealing said blade shaft in said bore.

22. The device of claim 17 wherein said blade is further characterized by a generally wedge-shaped blade having substantially parallel front margins nd curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge and further comprising:
    (a) at least one compression ring carried by said blade shaft for slidably sealing said blade shaft in said bore;
    (b) at least one O-ring carried by said blade shaft for slidably sealing said blade shaft in said bore; and
    (c) a blade pin aperture provided in said blade and a shaft pin aperture in said one end of said blade shaft in registration with said blade pin aperture and a pin projecting through said blade pin aperture and said shaft pin aperture for securing said blade to said blade shaft.

23. The device of claim 22 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge.

24. A rim-fired cartridge blank-operated device for splitting wood comprising:
    (a) an elongated, generally cylindrically-shaped barrel having a longitudinal bore therein, a threaded top nipple provided on one end of said barrel, a receiver bore located in said top nipple and communicating with said longitudinal bore and a threaded bottom nipple provided on the opposite end of said barrel;
    (b) a generally cylindrically-shaped blade seat having a threaded seat nipple projecting from one end thereof, said seat nipple threadibly connecting to said bottom nipple of said barrel; parallel seat legs projecting from the opposite end of said blade seat to define a bifurcation in said blade seat; and a shaft guide opening provided in said blade seat, said shaft guide opening oriented substantially in registration with said bore in said barrel when said blade seat is attached to said barrel;
    (c) an elongated, round shaft having one end slidably located in said bore of said barrel and said shaft guide opening and a generally wedge-shaped blade carried by the opposite end of said shaft, said shaft further characterized by an inset portion extending from said blade; a seal portion extending from said one end of said blade shaft, said inset portion having a diameter which is smaller than the diameter of said seal portion and said inset portion together with said barrel bore defining a fluid chamber; a shaft shoulder joining said inset portion and said seal portion; and a substantially viscous fluid provided in said fluid chamber;
    (d) a generally cylindrically-shaped sleeve fitted on said barrel in slidable relationship and handle means carried by said sleeve for handling said device and stabilizing said device on a length of wood to be split;
    (e) an internally-threaded cap threadibly attached to said top nipple of said barrel, said cap seated against said sleeve when said cap is fully threaded on said top nipple and an aperture provided in said cap;
    (f) receiver means positioned in said receiver bore, said receiver means adapted to receive at least one of the cartridge blank; and
    (g) a firing pin extending through said aperture in said cap in sliding relationship and provided in contact with the rim of the cartridge blank, whereby said blade is forced into the wood responsive to striking said firing pin and firing the cartridge blank.

25. The device of claim 24 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge.

26. The device of claim 24 further comprising a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

27. The device of claim 24 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, repectively, said secondary bevels converging to a blade edge and further comprising a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

28. The device of claim 24 further comprising:
 (a) a pair of compression rings carried by said seal portion of said blade shaft for slidably sealing said blade shaft in said bore; and
 (b) an O-ring carried by said seal portion of said blade shaft between said compression rings for slidably sealing said blade shaft in said bore.

29. The device of claim 24 wherein said blade is further characterized by a generally wedge-shaped blade having substantially parallel front margins and curved side margins connecting said front margins in spaced relationship, and further comprising a pair of oppositely-disposed primary bevels tapering from said front margins and a pair of oppositely-disposed secondary bevels terminating said primary bevels at one edge of said primary bevels, respectively, said secondary bevels converging to a blade edge and further comprising:
 (a) a pair of compression rings carried by said seal portion of said blade shaft for slidably sealing sid blade shaft in said bore;
 (b) an O-ring carried by said seal portion of said blade shaft between said compression rings for slidably sealing said blade shaft in said bore; and
 (c) a blade pin aperture provided in said blade and a shaft pin aperture provided in said one end of said blade shaft in registration with said blade pin aperture and a pin projecting through said blade pin aperture and said shaft pin aperture for securing said blade to said blade shaft.

30. The device of claim 29 further comprising a barrel O-ring disposed in the base of said seat nipple for sealing said seat nipple and said bottom nipple and a seat O-ring in said blade seat, said seat O-ring projecting into said shaft guide opening for sealing said inset portion of said shaft in said shaft guide opening.

* * * * *